United States Patent
Murota et al.

(10) Patent No.: US 10,468,946 B2
(45) Date of Patent: Nov. 5, 2019

(54) COOLING SYSTEM OF ELECTRIC MOTOR WITH FAN

(71) Applicant: FANUC Corporation, Yamanashi (JP)

(72) Inventors: Masahiro Murota, Yamanashi (JP); Toshifumi Muramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 280 days.

(21) Appl. No.: 14/956,432

(22) Filed: Dec. 2, 2015

(65) Prior Publication Data

US 2016/0164376 A1      Jun. 9, 2016

(30) Foreign Application Priority Data

Dec. 9, 2014   (JP) .................. 2014-248718

(51) Int. Cl.
*H02K 9/04* (2006.01)
*H02K 5/20* (2006.01)

(52) U.S. Cl.
CPC ............ *H02K 9/04* (2013.01); *H02K 5/20* (2013.01)

(58) Field of Classification Search
CPC ............ H02K 9/04; H02K 9/06; H02K 5/20
USPC ....................................... 310/58, 59, 62, 63
See application file for complete search history.

(56) References Cited

U.S. PATENT DOCUMENTS

| 8,167,585 | B2 * | 5/2012 | Kreitzer | .............. | H02K 5/10 |
| | | | | | 310/59 |
| 2011/0100253 | A1 * | 5/2011 | Koyama | ........... | F04D 25/105 |
| | | | | | 105/34.1 |
| 2013/0076172 | A1 * | 3/2013 | Koyama | ........... | H02K 9/06 |
| | | | | | 310/63 |
| 2013/0093272 | A1 * | 4/2013 | Shimono | ............. | H02K 9/14 |
| | | | | | 310/64 |
| 2014/0368066 | A1 * | 12/2014 | Ganev | ............... | H02K 9/06 |
| | | | | | 310/62 |

FOREIGN PATENT DOCUMENTS

| CN | 102684393 | A | | 9/2012 |
| JP | 2-188143 | A | | 7/1990 |
| JP | 09201007 | A | * | 7/1997 |
| JP | 9-322466 | A | | 12/1997 |
| JP | 10-313554 | A | | 11/1998 |
| JP | 2005168204 | A | * | 6/2005 |
| JP | 2011-36006 | A | | 2/2011 |
| JP | 2011-55654 | A | | 3/2011 |
| JP | 2013-74646 | A | | 4/2013 |

OTHER PUBLICATIONS

Machine Translation, Hisatsune, JP 09201007 A, Jul. 1997.*
"Duct, n." OED Online. Oxford University Press, Jun. 2018. Web. Jun. 29, 2018.*
Machine Translation, Kinoshita, JP-2005168204-A, Jun. 2005. (Year: 2005).*
Office Action in JP Application No. 2014-248718, dated Feb. 14, 2017.
Office Action in CN Application No. 201510886225.6, dated Jan. 22, 2018, 13pp.

* cited by examiner

*Primary Examiner* — Thomas Truong
(74) *Attorney, Agent, or Firm* — Hauptman Ham, LLP

(57) ABSTRACT

A cooling system of an electric motor with a fan, including a fan configured to generate fluid flow for cooling the electric motor, and a duct forming a flow channel for guiding a fluid flow generated by the fan, includes at least one hole provided in the duct.

5 Claims, 5 Drawing Sheets

COOLING SYSTEM OF ELECTRIC MOTOR WITH FAN

RELATED APPLICATIONS

The present application claims priority to Japanese Application Number 2014-248718, filed Dec. 9, 2014, the disclosure of which is hereby incorporated by reference herein in its entirety.

BACKGROUND OF THE INVENTION

1. Field of the Invention

The present invention relates to a cooling system of an electric motor having a fan.

2. Description of the Related Art

An electric motor generally includes a cooling system for improving the efficiency. For the cooling system, configuration in which a fan is fixed to a rotor comprising an electric motor and a rotation motor is cooled using air flow generated by the fan rotating with rotation of the rotor, configuration in which flow channel for cooling coolant is provided in a component comprising an electric motor and the electric motor is cooled by flow of the cooling coolant in the channel, and configuration in which an external fan is attached to an electric motor and the electric motor is cooled by air flow generated by the external fan.

As a prior art of the cooling system for cooling the electric motor, Japanese Patent Laid-Open No. 2011-036006 discloses configuration in which a fan is attached to a rotor such that an electric motor rotates while fluid flow for cooling the electric motor is generated to cool an electric motor. Japanese Patent Laid-Open No. 2011-055654 proposes configuration in which a flow channel is provided between a coil end and a coil end cover, and fluid flowing the channel performs cooling. In addition to that, Japanese Patent Laid-Open No. 02-188143 discloses an electric motor in which an external fan cools the electric motor, while an internal fan is provided also in the electric motor preventing decreasing of cooling efficiency.

However, the prior arts have problems shown below.

In cooling using a fan, a duct comprising a flow channel for guiding fluid flow generated by the fan is provided. In some cases, resistance for the fluid is large dependent on the configuration of the duct, and in this case fluid pressure and amount of flowing are not fully utilized and expected cooling capacity is not achieved.

Heretofore, when expected cooling capacity is not achieved, the configuration of the duct is changed, capacity of the fan is improved or a fan is added to increase the cooling capacity to solve the problem. However, in some cases, change of the configuration of the duct is restricted by configuration of a machinery, and in this case there is a problem that improvement of the capacity of the fan and addition of the fan causes increased cost.

SUMMARY OF THE INVENTION

In view of the above-described problems in the prior art techniques, a purpose of the present invention is to provide a cooling system using a fan, in which cooling capacity of the cooling system can be increased without changing the configuration of the duct for guiding fluid flow generated by the fan and without improvement of the capacity of the fan and addition of the fan.

A cooling system of an electric motor with a fan according to the present invention includes a fan configured to generate fluid flow for cooling the electric motor, and a duct forming a flow channel for guiding a fluid flow generated by the fan, including at least one hole provided in the duct.

The duct may consist a first flow channel connected to the fan and a second flow channel connected to the first flow channel, wherein the at least one hole is provided in the first duct.

A rotation axis of the fan may not be parallel to a rotation axis of the electric motor.

A rotation axis of the fan may be parallel to a rotation axis of the electric motor.

The present invention, with the configuration above, enables improvement of cooling capacity without changing the configuration of the duct for guiding fluid flow generated by the fan and without improvement of the capacity of the fan and addition of the fan, in a cooling system using the fan. With the configuration, a cooling system with low cost can be implemented.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
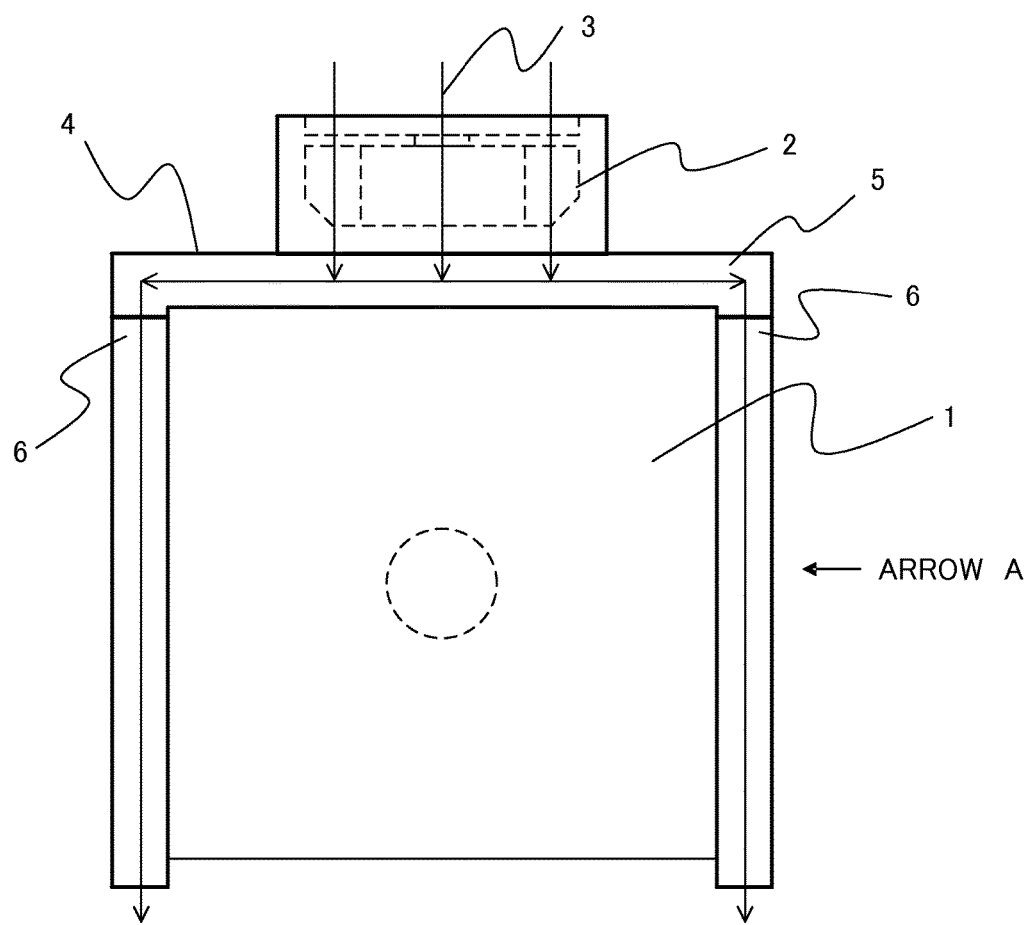
FIG. 1 is a view of a cooling system with an external fan in a prior art.

Embodiments of the present invention will be described with reference to the drawings. Components identical or similar to components in a conventional induction motor are indicated by identical reference numerals.

FIG. 1 is a view of a cooling system of an electric motor with an external fan in an example of a prior art. The electric motor 1 includes as a cooling system, an external fan 2 and a duct 4 for guiding fluid flow 3 generated by rotation of the external fan 2. The duct 4 is composed of a first flow channel 5 connected to the external fan 2 and a second flow channel 6 connected to the first flow channel.

Here, the external fan 2 is assumed to be, not a type capable of rotation number control, but a type which rotates at a constant rotation number when a constant electric voltage is input. The fluid flow 3 generated by the rotation of the external fan 2 is guided by the duct and flows around an electric motor 1. The fluid flow 3 removes heat generated by the electric motor 1 and discharge the heat to outside of the duct 4. At this time, since the electric motor 1 is placed in front of the external fan, resistance for the fluid flow 3 is large. In addition to that, a flow channel composed by the duct 4 has narrow cross section, such that resistance for the fluid flow 3 is large.

Therefore, though the external fan 2 rotates in a rotation number, but partial adverse current are generated and the amount of flowing in total is decreased to be less than the original amount of flowing which the external fan can generate. As a result, the original amount of flowing which the external fan 2 can generate is not fully generated and the electric motor 1 to be cooled can not be cooled enough.

In addition to that, partial flow of the fluid flow 3 generated by the external fan 2, sometimes retains in the flow channel. The retaining flow prevents cooling of the electric motor 1 to be cooled.

Figure 2:
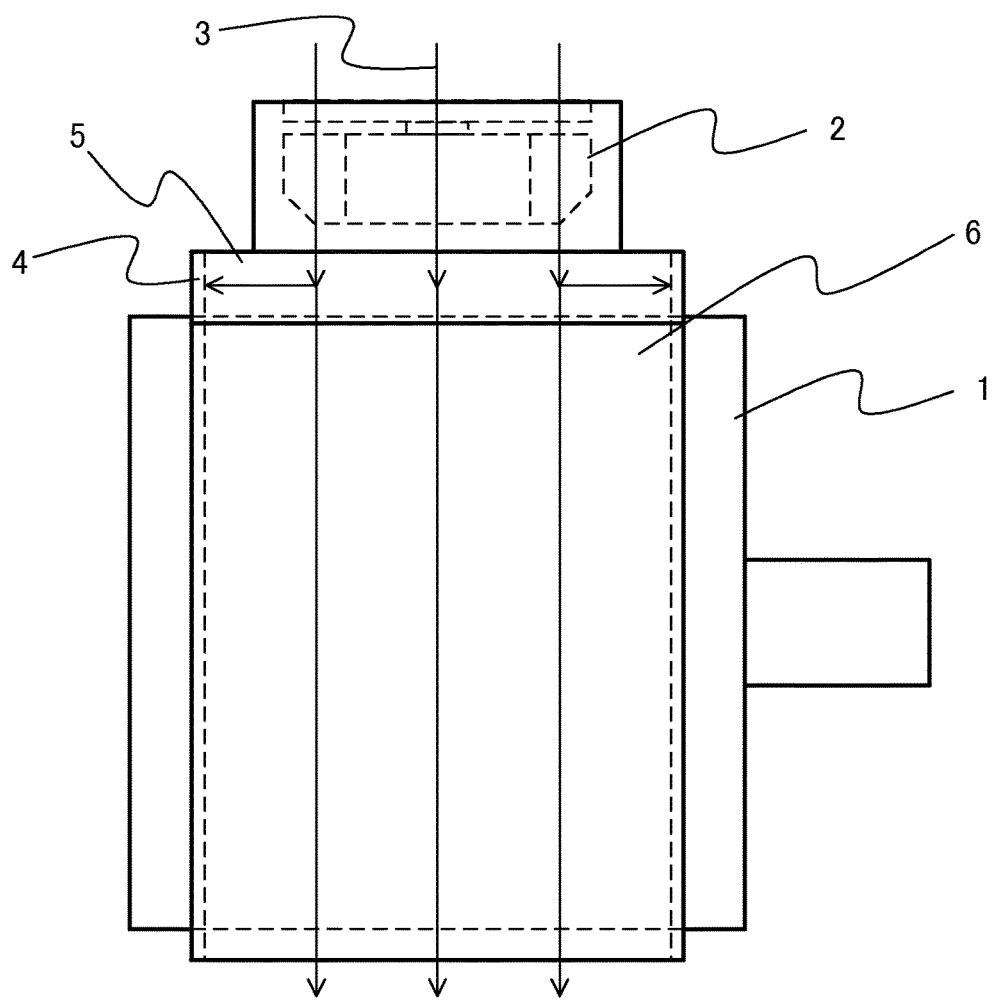
FIG. 2 is a view in a direction of an arrow A of a cooling system with an external fan in a prior art.

FIG. 2 is a view in a direction of an arrow A of FIG. 1. The fluid flow 3 is guided by the duct 4 to flow toward a surface opposite to a surface to which the external fan 2 is attached.

Figure 3:
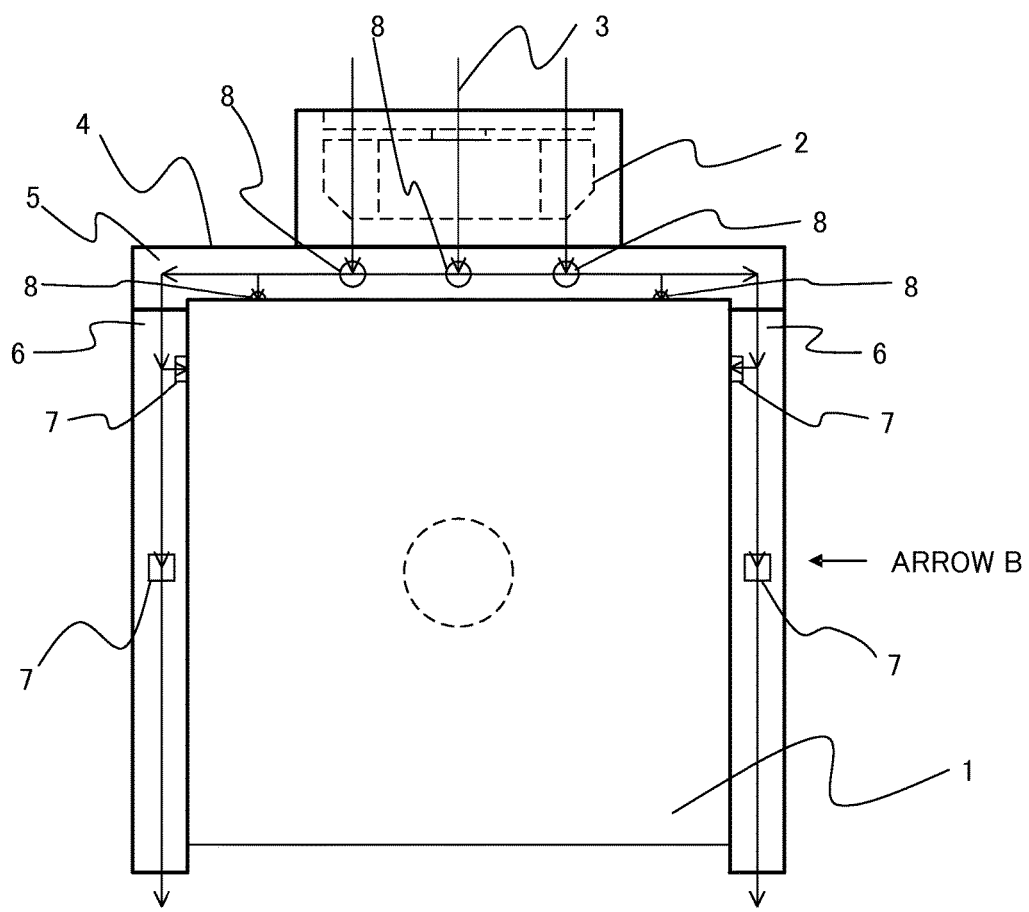
FIG. 3 is a view of a cooling system with an external fan according to an embodiment 1 of the present invention.

FIG. 3 is a view of a cooling system with an external fan according to an embodiment of the present invention. Components identical or similar to components in FIG. 1 are indicated by identical reference numerals. The difference between the duct configuration of the present embodiment and the duct configuration of the cooling system with the external fan in the prior art is that holes 7, 8 are provided for releasing the fluid flow 3 at the duct 4.

By providing the holes 7, 8 at the duct 4, resistance for the fluid flow by the duct 4 is decreased. The part of the fluid flow 3, generated by the rotation of the external fan 2, which flows reversely to reduce the amount of flowing in total in the prior art, flows out of the holes 7, 8 to work for cooling the electric motor 1. With this configuration, all of the original amount of flowing which the external fan can generate can be used for cooling of an object to be cooled, and the cooling of the electric motor 1 to be cooled is performed enough.

Concerning position where the hole is provided, the hole is provided at the first flow channel 5 connected to the external fan 2, producing effect. In the embodiment, the hole 8 corresponds to the hole provided at the first flow channel 5 connected to the external fan 2.

In addition to that, position where retaining flow in the duct 4 is likely to be generated may be confirmed by experiment, simulation, or the like, and the holes 7, 8 may be provided in neighborhood of the position, preferably position before the confirmed position, to more effectively decrease the resistance for the fluid flow 3.

Figure 4:
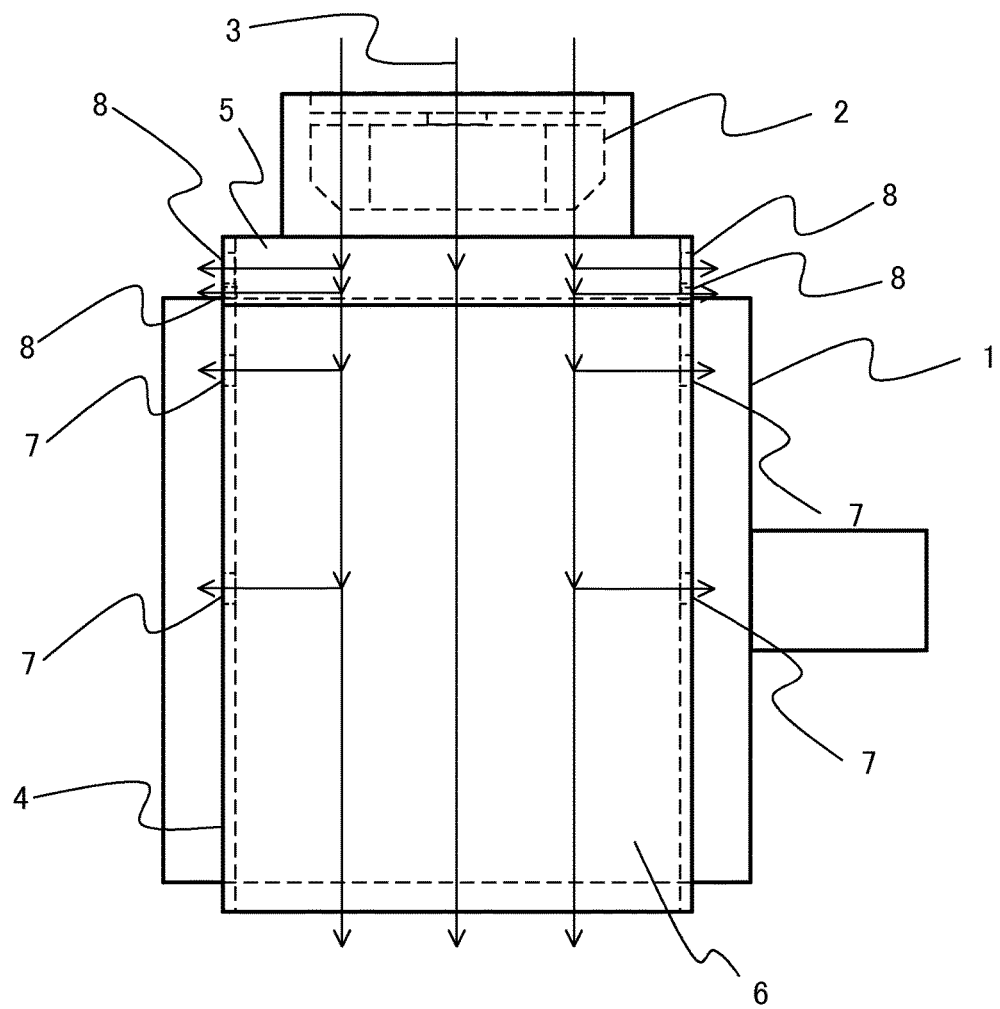
FIG. 4 is a view in a direction of an arrow B of a cooling system with an external fan according to an embodiment 1 of the present invention.

FIG. 4 is a view in a direction of an arrow B of FIG. 3. The fluid flow 3 is guided by the duct to flow toward the opposite surface of a surface to which the external fan 2 is attached, while the fluid flow 3 flows to outside of the duct 4 through plural holes 7, 8 provided at the duct 4.

Figure 5:
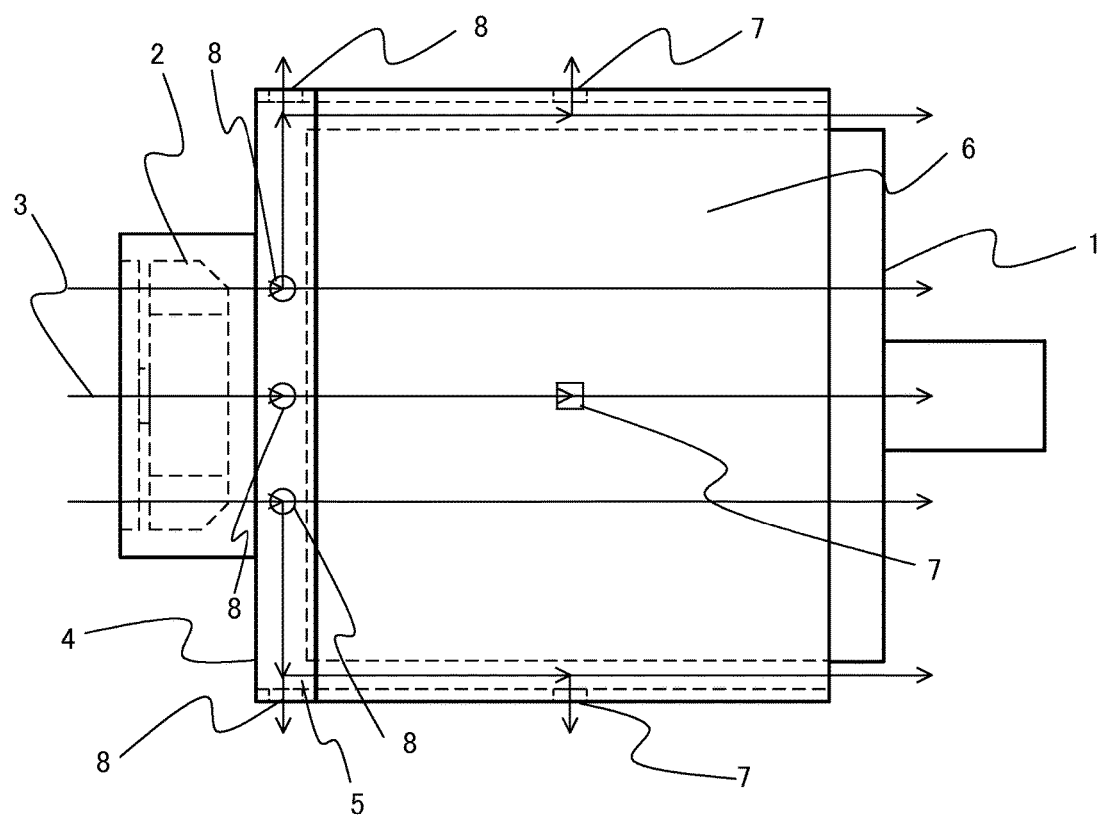
FIG. 5 is a view of a cooling system with an external fan according to an embodiment 2 of the present invention.

FIG. 5 is a view of configuration of a duct of a cooling system with an external fan according to another embodiment of the present invention. Components identical or similar to components in FIG. 3 are indicated by identical reference numerals. The external fan 2 is attached such that a rotation axis of the external fan 2 is not parallel to a rotation axis of the electric motor 1 in FIG. 3, while FIG. 5 shows an example in which the external fan 2 is attached such that a rotation axis of the external fan 2 is parallel to a rotation axis of the electric motor 1.

In this case, by providing the holes 7, 8 at the duct 4, resistance for the fluid flow by the duct 4 is decreased, and the part of the fluid flow 3, generated by the rotation of the external fan 2, which flows reversely to reduce the amount of flowing in total in the prior art, flows out of the holes, such that all of the original amount of flowing which the external fan can generate can be used for cooling of an object to be cooled.

With the configuration above, enough cooling is performed without changing the configuration of the duct for guiding fluid flow generated by the fan and without improvement of the capacity of the fan and addition of the fan, in a cooling system using the fan.

The embodiments of the present invention are described above. But the present invention is not limited to the above-described embodiments, and, the configuration thereof can be appropriately modified to be implemented in the other embodiments.

For example, in the above-described embodiments of the present invention, the fan is assumed to be the type in which rotation number can not be controlled, but the type in which rotation number can be controlled may be used. It should be noted that, concerning the configuration of the hole provided at the duct, as shown in FIG. 3, the configuration of the hole is not limited to be circular.

The invention claimed is:

1. A cooling system of an electric motor, comprising:
   a fan configured to generate a fluid flow for cooling the electric motor;
   a duct forming a flow channel for guiding the fluid flow generated by the fan;
   at least one hole provided in a straight portion of the duct;
   at least one further hole,
   wherein
   the at least one hole is provided laterally with respect to a flowing direction of the fluid flow through the straight portion of the duct,
   the at least one hole is located downstream from the fan in the flowing direction of the fluid flow,
   the at least one hole provides an exit for a part of the fluid flow to flow out of the duct for cooling the electric motor,
   the at least one hole is located upstream in the flowing direction of the fluid flow from a predetermined position, at which retaining flow in the duct is to be generated, to decrease resistance for the fluid flow,
   the duct includes
      a first duct connected to the fan, and
      a second duct connected to the first duct to receive the fluid flow from the first duct,
   the at least one hole is provided in the first duct which defines the straight portion,
   the at least one further hole is provided in the second duct which is a further straight portion of the duct,
   the at least one further hole is provided laterally with respect to the flowing direction of the fluid flow through the further straight portion of the duct,
   the first duct extends along a first side of the electric motor, and
   the second duct is angled with respect to the first duct, and extends along a different, second side of the electric motor.

2. A cooling system according to claim 1, wherein a rotation axis of the fan is not parallel to a rotation axis of the electric motor.

3. A cooling system according to claim 1, wherein a rotation axis of the fan is parallel to a rotation axis of the electric motor.

4. A cooling system according to claim 1, wherein
the at least one hole in the first duct and the at least one further hole in the second duct are located downstream from the fan in the flowing direction of the fluid flow, and
the at least one hole and the at least one further hole provide exits for parts of the fluid flow to flow out of the duct for cooling the electric motor.

5. A cooling system of an electric motor, comprising:
a fan configured to generate a fluid flow for cooling the electric motor;
a duct forming a flow channel for guiding the fluid flow generated by the fan;
at least one hole provided in a straight portion of the duct; and
at least one further hole,
wherein
the at least one hole is provided laterally with respect to a flowing direction of the fluid flow through the straight portion of the duct,
the at least one hole is located downstream from the fan in the flowing direction of the fluid flow,
the at least one hole provides an exit for a part of the fluid flow to flow out of the duct for cooling the electric motor,
the duct includes
  a first duct connected to the fan and extending a first side of the electric motor, and
  a second duct connected to the first duct to receive the fluid flow from the first duct, being angled with respect to the first duct, and extending along a different, second side of the electric motor,
the at least one hole is provided in the first duct which defines the straight portion,
the at least one further hole is provided in the second duct which is a further straight portion of the duct,
the at least one further hole is provided laterally with respect to the flowing direction of the fluid flow through the further straight portion of the duct,
the at least one hole in the first duct and the at least one further hole in the second duct are located downstream from the fan in the flowing direction of the fluid flow, and
the at least one hole and the at least one further hole provide exits for parts of the fluid flow to flow out of the duct for cooling the electric motor.

* * * * *